US009744586B2

(12) United States Patent
Ide et al.

(10) Patent No.: US 9,744,586 B2
(45) Date of Patent: Aug. 29, 2017

(54) BINDER COATED REFRACTORIES, CASTING MOLD USING THE SAME, AND METHOD OF MANUFACTURING CASTING MOLD USING THE SAME

(71) Applicant: LIGNYTE CO., LTD., Osaka-shi, Osaka (JP)

(72) Inventors: Isamu Ide, Sakai (JP); Toru Seki, Sakai (JP); Shinji Nishida, Osaka (JP)

(73) Assignee: LIGNYTE CO., LTD., Osaka (JP)

( * ) Notice: Subject to any disclaimer, the term of this patent is extended or adjusted under 35 U.S.C. 154(b) by 69 days.

(21) Appl. No.: 14/719,997

(22) Filed: May 22, 2015

(65) Prior Publication Data

US 2015/0251241 A1  Sep. 10, 2015

Related U.S. Application Data

(62) Division of application No. 13/395,396, filed as application No. PCT/JP2010/065428 on Sep. 8, 2010, now abandoned.

(30) Foreign Application Priority Data

Sep. 10, 2009  (JP) .................................. 2009-209123

(51) Int. Cl.
B22C 1/26 (2006.01)
B22C 9/02 (2006.01)
B22C 1/22 (2006.01)
B22C 9/12 (2006.01)
C09D 103/02 (2006.01)

(52) U.S. Cl.
CPC .............. *B22C 1/26* (2013.01); *B22C 1/2253* (2013.01); *B22C 9/02* (2013.01); *B22C 9/12* (2013.01); *C09D 103/02* (2013.01)

(58) Field of Classification Search
CPC ........... B22C 1/26; B22C 1/2253; B22C 9/02; B22C 9/12
See application file for complete search history.

(56) References Cited

U.S. PATENT DOCUMENTS 5,300,144 A    4/1994  Adams
2006/0071364 A1  4/2006  Zenpo et al.
(Continued)

FOREIGN PATENT DOCUMENTS

EP    1 561 527 A1    8/2005
GB        902199 A *  7/1962  ........... B22C 1/2293
(Continued)

OTHER PUBLICATIONS

Supplementary European Search Report for the Application No. EP 10 81 5390 dated Jul. 14, 2015.
(Continued)

*Primary Examiner* — Kevin P Kerns
*Assistant Examiner* — Steven Ha
(74) *Attorney, Agent, or Firm* — Cheng Law Group, PLLC (57) ABSTRACT

The binder coated refractories comprises the refractory aggregates and the solid-form coating layer which comprises the sugar group as the binder and which is provided to the surface of the refractory aggregates. According to this, the sugar group is used as the binder for bonding the refractory aggregates. Further, even if the sugar group is thermally decomposed, the sugar group emits the carbon dioxide and the water. Therefore, there is little likelihood of emitting the harmful gas. Therefore, it is possible to reduce the environmental pollution. Further, the sugar group is thermally decomposed easily. Therefore, it is possible to manufacture the casting mold having the good breaking property.

12 Claims, 1 Drawing Sheet

(56) References Cited

U.S. PATENT DOCUMENTS

| | | |
|---|---|---|
| 2008/0021133 A1 | 1/2008 | Furusawa et al. |
| 2009/0127730 A1 | 5/2009 | Zenpo et al. |
| 2009/0211725 A1 | 8/2009 | Asano et al. |
| 2009/0236070 A1 * | 9/2009 | Ide .......... B22C 15/24 164/526 |
| 2010/0064935 A1 | 3/2010 | Zenpo et al. |
| 2010/0140823 A1 | 6/2010 | Asano et al. |

FOREIGN PATENT DOCUMENTS

| | | | |
|---|---|---|---|
| JP | 54-51928 A | 4/1979 | |
| JP | 55-8327 A | 1/1980 | |
| JP | 55-16720 A | 2/1980 | |
| JP | 11-129054 A | 5/1999 | |
| JP | 2002-346691 A | 12/2002 | |
| JP | WO 2007132669 A1 * | 11/2007 | ............ B22C 9/12 |
| JP | 2009-90334 A | 4/2009 | |
| WO | WO-2006/003945 A1 | 1/2006 | |
| WO | WO-2007/058254 A1 | 5/2007 | |

OTHER PUBLICATIONS

International Search Report for the Application No. PCT/JP2010/065428 mailed Oct. 5, 2010.
Yoshida, Tetsuo et al., "Evaporation of Water in Air, Humid Air, and Superheated Steam", Ind. Eng. Chem. Process Des. Dev., 1970, vol. 9, No. 2, pp. 207-214.

* cited by examiner

FIG. 1A

FIG. 1B

US 9,744,586 B2

BINDER COATED REFRACTORIES, CASTING MOLD USING THE SAME, AND METHOD OF MANUFACTURING CASTING MOLD USING THE SAME

CROSS REFERENCE TO RELATED APPLICATIONS

This application is a Divisional Application of patent application Ser. No. 13/395,396, filed on May 16, 2012, which is a 371 application of Application No. PCT/JP2010/065428, filed on Sep. 8, 2010, which is based on Japanese Patent Application No. 2009-209123, filed on Sep. 10, 2009, the entire contents of which are hereby incorporated by reference.

TECHNICAL FIELD

This invention relates to binder coated refractories used for manufacturing of a casting mold, a casting mold using the binder coated refractories, and a method of manufacturing the casting mold using the binder coated refractories.

BACKGROUND ART

Conventionally, there are a plurality of methods of manufacturing the casting mold. As to one of the method of manufacturing the casting mold, the shell molding method is well known. The shell molding method is a method for manufacturing the casting mold by bonding the refractory aggregates by the binder. The refractory aggregates are exemplified by silica sand. The shell molding method is realized as an effective method for producing the casting mold having a good dimensional accuracy. According to this reason, the shell molding method is frequently used when producing the casting mold.

As to the binder for the shell molding method, the thermosetting resin such as phenol resin is generally used. The refractory aggregates are mixed with the thermosetting resin to produce the resin coated sand. The resin coated sand comprises the refractory aggregates each are coated at its surface with the thermosetting resin. According to filling the metallic mold with the resin coated sand and then melting-curing the thermosetting resin, the casting mold is produced.

The resin coated sand is granulated substance which itself is dry. In addition, the resin coated sand has a good flowability. Therefore, it is possible to easily fill the metallic mold with the resin coated sand. In addition, the resin coated sand has a good deterioration resistance when handling is made under air atmosphere. According to this, the shell molding method using the resin coated sand is well-used for manufacturing the mold for the automobile.

In the resin coated sand, as to the thermosetting resin binder which coats the surface of the refractory aggregate, as explained above, the phenol resin is conventionally used. Especially, a novolac-type phenolic resin is well-used as the thermosetting resin binder. The novolac-type phenolic resin has a thermoplastic property. The novolac-type phenolic resin is not cured when heated. Therefore, in using the novolac-type phenolic resin, a curing agent is typically mixed with the novolac-type phenolic resin. The curing agent is exemplified by the hexamethylenetetramine, (Refer to Patent Literature 1 hereinafter explained)

When the resin coated sand having the novolac-type phenolic resin as the binder is filled in the heated metallic mold having a temperature of, for example, 250 degrees Celsius to 350 degrees Celsius, the heat in the metallic mold is transferred to the hexamethylenetetramine. Then, the hexamethylenetetramine is decomposed into the formaldehyde and the ammonia. A most part of the formaldehyde reacts with the novolac-type phenolic resin. According to this reaction, the phenol resin is cured to have a non-solubility.

However, "a part of the formaldehyde which is not reacted" and "most of ammonia" are volatilized into the atmosphere during and after producing the casting mold. The formaldehyde and the ammonia cause the environmental pollution. When the resol-type phenolic resin is used as the phenol resin, it is possible to reduce the above problem. However, also in using the resol-type phenolic resin, the some formaldehyde is unreacted and is volatilized into the atmosphere. Therefore, the resol-type phenolic resin has the above problem, too.

In addition, when the resin coated sand with the phenol resin as the binder is used in manufacturing of the molding, the molten metal is poured into the casting mold. However, when pouring the molten metal into the casting mold, the heat in the molten metal degrades the phenol resin. Consequently, the gases such as phenol, xylenol, toluene, benzene, and methane are released. This also causes the problem of pollution.

Furthermore, the phenol resin has a good heat resistance property. In addition, the phenol resin has a large amount of residual carbon. Therefore, even if pouring the molten metal into the casting mold to form the cast metal is performed, it is difficult to break the casting mold by the heat of the molten metal. Owing to this, in order to demold the cast metal from the casting mold, there is a need to apply the force to the casting mold. In addition, there is a need to apply the high-temperature heat over a long period to decompose the phenol resin. That is, demolding the cast metal from the casting mold requires the additional work.

CITATION LIST

PATENT LITERATURE JAPANESE PATENT APPLICATION PUBLICATION No. 2002-346691A

SUMMARY OF INVENTION

Technical Problem

This invention is produced in view of the above. An object of this invention is to produce the binder coated refractories for reduce the generation of the gas which pollute the environment. In addition, an object of this invention is to produce the casting mold being easily broken when demolding the cast metal. In addition, an object of this invention is to produce the method of manufacturing the casting mold which is reduced the generation of the gas which pollutes the environment and which has a good breakage property.

Problem to Solve

This invention discloses the binder coated refractories each comprises the refractory aggregate. Further, each the refractory aggregate is coated at its surface with the coating layer. The coating layer comprises the binder having the sugar group. The coating layer has a solid form.

According to this invention, the sugar group acts as the binder to bond the refractory aggregates with each other. In addition, if the sugar group is thermally decomposed, the sugar group emits the carbon dioxide gas and the water. Therefore, it is possible to reduce the emission of the harmful gas and reduce the environmental pollution. Further, the sugar group has a property of being thermally decomposed easily. Therefore, it is possible to produce the casting mold having a good breaking property with using the binder coated refractories.

Further, the coating layer preferably comprises the binder which has a thermosetting resin in addition to the sugar group.

According to this, in addition to the bonding of the sugar group, the bonding between the refractory aggregates is also established by the thermosetting resin. Therefore, this configuration makes it possible to improve the strength of the bonding of the refractory aggregates.

Furthermore, the thermosetting resin preferably comprises the phenol resin.

According to the phenol resin, the bonding strength of the refractory aggregates is improved.

In addition, the coating layer preferably comprise the carboxylic acid as a curing agent of the sugar group.

Furthermore, an amount of the carboxylic acid with respect to 100 part by mass of the sugar group is from 0.1 parts by mass or more to 10 parts by mass or less.

According to this, the carboxylic acid cross-links and cures the sugar group. Therefore, it is possible to improve the bonding strength of the refractory aggregates.

Furthermore, the casting mold of this invention is made of the binder coated refractories which are bonded with each other by the binder of the coating layer.

According to this, the sugar group acts as the binder between the refractory aggregates to form the casting mold. In addition, if the sugar group is thermally decomposed, the sugar group emits the carbon dioxide and the water. In other words, the sugar group does not emit the harmful gas. Therefore, there is little likelihood that the sugar group emits something to pollute the environment. In addition, the sugar group is thermally decomposed by the sugar group, easily. Therefore, using the binder coated refractories of the above makes it possible to produce the casting mold having the good breaking property.

In addition, the method of manufacturing the casting mold comprises the filling step and the solidifying-hardening step. In the filling step, filling the binder coated refractories in the casting flask is performed. In the solidifying-hardening step, supplying the water vapor into the casting flask and heating the binder coated refractories to solidify-harden the binder of the coating layer are performed.

The water vapor has a latent heat of the condensation. Therefore, according to supplying the water vapor into the casting flask filled with the binder coated refractories, the latent heat is transferred from the water vapor to the binder coated refractory when the binder coated refractories are exposed to the water vapor. In other words, there is no need to preheat the casting flask to high temperature. Therefore, this method makes it possible to manufacture the casting mold stably at short times. Further, even if the harmful gas is generated, the harmful gas is absorbed to the condensation water of the water vapor. Therefore, it is possible to decrease the environmental pollution.

Furthermore, this invention comprises the step of supplying the water vapor into the casting flask to "provide the sugar group in the binder of the coating layer with the sticky paste condition" and to "increase the temperature of the binder by the latent heat of the condensation of the water vapor to solidify-harden the binder".

When the water vapor is supplied into the casting flask, the binder coated refractories are exposed to the water vapor. Consequently, the heat of the water vapor is transmitted to the binder coated refractory. Then, the condensation water is developed. According to the condensation water, the sugar group is swelled to have the sticky paste condition. The sugar group having the sticky paste condition bonds the refractory aggregates with each other. Further, by the latent heat of the condensation of the water vapor, the binder coated refractories is increased their temperature or more for solidify-harden the binder. Therefore, it is possible to manufacture the casting mold having a high strength.

In addition, this invention comprises the step of supplying the water vapor into the casting flask to increase the temperature of the binder coated refractory by the latent heat of the condensation of the water vapor and supplying the heated gas into the casting flask to evaporate the condensation water in the casting flask and to solidify-harden the binder of the binder coated refractories.

By supplying the water vapor into the casting flask filled with the binder coated refractories, the latent heat of the condensation of the water vapor rapidly increase the temperature of the binder coated refractory to about 100 degrees C. Then, by supplying the heated gas into the casting flask, the condensation water is rapidly evaporated by the gas having a little moisture. In addition, supplying the heated gas makes it possible to increase the condensation water to 100 degrees C. or more at short times. Therefore, this configuration makes it possible to raise the rate of increase of the temperature in the casting flask to the temperature or more for solidifying-hardening the binder of the binder coated refractories. Therefore, this configuration makes it possible to manufacture the casting mold having the high strength at short times.

Furthermore, the method of manufacturing the casting mold of this invention comprises a step of adding the water to the binder coated refractories to prepare the mixture of them, filling the mixture in the casting flask, and freezing the water.

With this method, by the water freezing, the refractory aggregates are bonded. Furthermore, the water changes the sugar group of the coating layer of the binder coated refractory into the sticky paste condition. The refractory aggregates are bonded with the sugar group having the sticky paste condition. Therefore, this configuration makes it possible to manufacture the casting mold having the high strength.

In addition, this invention discloses another method of manufacturing the casting mold. The method of manufacturing the casting mold disclosed in this invention uses the binder coated refractories. Each the binder coated refractory comprises the refractory aggregate and the coating layer. The refractory aggregate has the fire resistance. The coating layer coats the surface of the refractory aggregate. The coating layer has a solid form. The coating layer has a sugar group as a binder. The method of manufacturing the casting mold comprises a filling step and a solidifying-hardening step. In the filling step, filling the binder coated refractories into the casting flask is performed. In the solidifying-hardening step, supplying the water vapor into the casting flask to change the solid form of the sugar group into the sticky paste condition of the sugar group is performed. Subsequent to the step of supplying the water vapor, heating the binder coated refractories to solidify-harden the binders of the coating layers. Consequently, the binder coated refractories are bonded with each other.

The coating layer preferably comprises the thermosetting resin. In addition, the thermosetting resin preferably comprises the phenol resin.

In this case, the casting mold made of the binder coated refractories is capable of keeping its form under high temperature.

The coating layer preferably comprises the carboxylic acid.

In heating step, heating the binder coated refractories preferably comprises the step of increasing the temperature of the sticky-paste-condition sugar group by the latent heat of the water vapor to solidify-harden the binder having the sticky paste condition.

Further, the step of heating the binder coated refractories preferably comprises a first heating step and evaporating step. In the first heating step, increasing the temperature of the sugar group having the sticky paste condition by the latent heat of the condensation of the water vapor is performed. In the evaporating step, supplying the heated gas into the casting flask to evaporate the condensation water in the casting flask and to heat the binder to the temperature or more which is sufficient to solidify-harden the binder.

The heated gas is preferably the heated air.

The heated gas is also preferably the mixture gas comprises the water vapor and the gas mixed with each other.

Furthermore, the water vapor is preferably a superheated steam.

The refractory aggregates is preferably selected from at least one of silica sand, pit sand, alumina sand, olivine sand, chromite sand, zircon sand, mullite sand, and the artificial sand.

It is preferred that the sugar group is at east one of monomeric sugar, oligosaccharides and polysaccharides.

The thermosetting resin preferably coats the surface of the refractory aggregates. In addition, the sugar group preferably coats the surface of the thermosetting resin.

The method of manufacturing the casting mold preferably comprises the coating step. The coating step is performed before the filling step of filling the binder coated refractory to the casting flask. The coating step comprises "a step of heating the refractory aggregates", "a step of adding the thermosetting resin to the heated refractory aggregates", "a step of mixing the thermosetting resin and the heated refractory aggregates to obtain the mixture of the refractory aggregates and the thermosetting resin", "a step of adding the sugar group dissolved in or dispersed into the water to the mixture", "a step of mixing the mixture with the sugar group", and "a step of drying the mixture and the sugar group".

Preferably, the proportion of an amount of the binder with respect to total weight of the refractory aggregates is from "0.5 percents by mass or more" to "5.0 percents by mass or less".

Preferably, the proportion of an amount of the thermosetting resin with respect to total amount of the binder is from "0 percents by mass or more" to "80 percents by mass or less". More preferably, the proportion of an amount of the thermosetting resin with respect to total amount of the binder is from "0 percents by mass or more" to "50 percents by mass or less".

Further, this invention discloses the method of manufacturing the casting mold. The method of manufacturing the casting mold uses the binder coated refractories. Each the binder coated refractories comprises the refractory aggregate and the coating layer. Each the refractory aggregate has the fire resistance. Each the refractory aggregate is coated with the coating layer. The coating layer comprises the binder having the sugar group. The coating layer has the solid form. The method of manufacturing the casting mold comprises a filling step and a solidifying-hardening step. In the filling step, filling the binder coated refractories into the casting flask is performed. In the solidifying-hardening step, supplying the wet into the casting flask to "provide the wet to the binder" and "change the solid-form sugar group into sticky-paste-condition sugar group" is performed. Then, the step of supplying the superheated steam into the casting flask to heat the binder coated refractories is performed. Consequently, the temperature of the binder coated refractories is increased. According to increasing the temperature of the binder coated refractories, "drying the binder coated refractories" and "solidifying-hardening—the binders in the coating layers" are performed. Consequently, the binder coated refractories are bonded with each other.

Advantageous Effect of the Invention

The binder coated refractories of this invention have the sugar group as the binder to bond the refractory aggregates with each other. Even if the sugar group is thermally decomposed, the sugar group emits the carbon dioxide and the water. In other words, the sugar group emits little harmful gas. Therefore, there is little likelihood of causing the environmental pollution. Further, the sugar group is thermally decomposed, easily. Therefore, it is possible to produce the casting mold having a good breaking property with using the binder coated refractories.

Furthermore, according to the method of manufacturing the casting mold of this invention, it is possible to manufacture the casting mold with little environmental pollution.

BRIEF EXPLANATION OF DRAWINGS

FIG. 1 A shows a cross sectional view of one example of the manufacturing of the casting mold of this invention.

FIG. 1 B shows a cross sectional view of one example of the manufacturing of the casting mold of this invention.

DESCRIPTION OF EMBODIMENTS

Hereinafter an explanation of this embodiment is made.

The refractory aggregates in this invention are not limited, in particular. However, the refractory aggregates are exemplified by silica sand, pit sand, alumina sand, olivine sand, chromite sand, zircon sand, mullite sand, and artificial sand. In addition, it is possible to use only one kind of them as the refractory aggregates. In addition, it is also possible to use a plurality kinds of them which are mixed with each other as the refractory aggregates. In addition, the artificial sand is exemplified by the sand which is artificially produced and which has calcia, magnesia, and alumina. In addition, the artificial sand is exemplified by the sand which is artificially produced by blasting the rocks. That is, the artificial sand may be realized by the sand which is artificially produced and which is typically used.

The binder coated refractories in this invention is produced by coating the surface of each one of the grains of the refractory aggregates with the coating layer having the binder. In addition, in this invention, the sugar group is used as the binder. The sugar group is exemplified by the monomeric sugar, oligosaccharides and polysaccharides. In addition, it is possible to use only one kind of them as the binder. In addition, it is possible to use a plurality kinds of them as the binder, parallelly.

In this invention, the monomeric sugar used in this invention is not limited especially. However, the monomeric sugar is exemplified by the glucose (grape sugar), fructose (fruit sugar), and galactose.

In addition, the oligosaccharides are exemplified by two-sugar such as maltose (malt sugar), sucrose, lactose (milk sugar), and cellobiose.

Furthermore, the polysaccharides is exemplified by starch sugar, dextrin, xanthan gum, curdlan, pullulan, cycloamylose, chitin, cellulose, and starch. It is possible to use only one kind of them. In addition, it is possible to use a plurality kinds of them in parallel. In addition, the starch is exemplified by raw starch and modified starch. Specifically, the starch is exemplified by the raw starch such as potato starch, cornstarch, sweet potato starch, tapioca starch, sago starch, rice starch, amaranth starch. The starch is exemplified by the modified starch that the raw starch explained above is modified. (roasted dextrin, enzyme denaturation dextrin, acid treating starch, oxidized starch, dialdehyde starch, etherified starch (carboxymethyl starch, hydroxyalkyl starch, cation starch, methylol starch), esterified starch, (acetic acid starch, starch phosphate, succinic acid starch, octenyl succinic acid starch, maleic acid starch, highly fatty acid starch), bridge starch, craft starch, and heat and humidity treating starch. Especially, the starch having low molecular compound such as roasted dextrin, enzyme denaturation dextrin, acid treating starch, oxidized starch is preferred. In addition, the starch having low viscosity such as bridge starch is also preferred.

In addition, it is possible to use the seed powder of the grain having the sugar group as the binder. The seed powder of the grain having the sugar group is exemplified by the wheat flower, the rice flour, and the corn flour.

The coating layer may have a carboxylic acid as the curing agent for the sugar group, especially for polysaccharide. Although the carboxylic acid is not limited, the carboxylic acid is exemplified by the oxalic acid, maleic acid, succinic acid, citric acid, butanetetradicarboxylic acid, methyl vinyl ether—maleic acid anhydride copolymer. In addition, with regard to the contained amount of the carboxylic acid in the coating layer, it is preferred that an amount of carboxylic acid is from 0.1 parts by mass to 10 parts by mass with respect to 100 parts by mass of sugar group. In addition, it is preferred that the carboxylic acid is mixed with water prior to mixing the carboxylic acid with the sugar group. Consequently, the carboxylic acid is enhanced its efficiency of the curing agent.

In this invention, the coating layer includes the binder which has the sugar group. However, the coating layer may include the binder which has the sugar group and the thermosetting resin in combination in parallel. The contained amount of the thermosetting resin in the coating layer is preferably set to be equal to or less than 80 percents by mass with respect to the total amount of the sugar group and the thermosetting resin. In addition, the contained amount of the thermosetting resin in the coating layer is more preferably set to be equal to or less than 50 percents by mass with respect to the total amount of the sugar group and the thermosetting resin. Although the thermosetting resin is not limited in particular, the thermosetting resin is exemplified by the resol-type phenolic resin and the novolac-type phenolic resin. In addition, it is possible to only use the resol-type phenolic resin or to only use the novolac-type phenolic resin. In addition, it is possible to use the resol-type phenolic resin and the novolac-type phenolic resin in combination with each other. Furthermore, it is possible to use the binder which has the sugar group and the phenol resin which are reacted in advance.

In addition, in order to improve the flowability of the binder coated refractories, the coating layer may further include the lubricant. As to the lubricant, the lubricant of aliphatic hydrocarbon type, the lubricant of fatty amides type, lubricant of metallic soap, lubricant of fatty acid ester, and composition lubricant may be used as the lubricant. The lubricant of aliphatic hydrocarbon type is exemplified by the paraffin wax and the carnauba wax. Then the lubricant of fatty amides type is exemplified by the highly fatty alcohol, the ethylenebis stearic acid amide, and stearic amide. In addition, the lubricant of metallic soap is especially preferred to the lubricant. As to the metallic soap, calcium stearate, barium stearate, zinc stearate, aluminum stearate, magnesium stearate, and the mixture of them are exemplified.

The grains of the refractory aggregate are mixed with the sugar group. In addition, as necessary, the carboxylic acid, the thermosetting resin such as phenol resins, the reactant of the sugar group and the phenol resins, and the lubricant are mixed with the refractory aggregate and the sugar group. In this manner, each the refractory aggregate is coated with the coating layer which includes the binder having the sugar group as the main component. Consequently, the binder coated refractories in this invention are produced. Amount of the coating layer for coating the refractory aggregate is varied according to the ingredient and the intended purpose. Therefore, it is difficult to categorically determine an amount of the coating layer. However, it is preferred, in general, that an amount of carboxylic acid is set to be from 0.5 parts by mass to 5.0 parts by mass with respect to 100 parts by mass of refractory aggregate. It is preferred that an amount of lubricant is set to be from 0.02 parts by mass to 0.15 parts by mass with respect to 100 parts by mass of refractory aggregate. If an amount of the binder exceeds 5.0 parts by mass with respect to 100 parts by mass of the refractory aggregate, the kneading of the refractory aggregate and the binder is made difficult. In contrast, it is possible to keep the strength if an amount of the binder is set to be equal to or more than 0.5 parts by mass with respect to 100 parts by mass of the refractory aggregate, compared with a case where an amount of the binder is set to be less than 0.5 parts by mass with respect to 100 parts by mass of the refractory aggregate. Each the refractory aggregate may be coated with the coating layer by means of the hot coat method, the cold coat method, semi-hot coat method, and powder solvent method.

In the hot coat method, the heated refractory aggregate having the temperature from 110 degrees C. to 180 degrees C. is mixed with the solid-form binder to melt the solid binder by the heat of the refractory aggregate. Consequently, the surface of the refractory aggregate is coated by the molten binder. Then, the mixture of the refractory aggregates and the binder are cooled. In this manner, the binder coated refractories having the shape of granularity and having the flowability. Or, in the hot coat method, the refractory aggregates having the temperature from 110 degrees C. to 180 degrees C. are mixed with the liquid solution having the solvent and the binder dissolved thereto or dispersed thereinto. Consequently, each the refractory aggregates is coated with the binder. Then, the solvent is volatilized. In this manner, the binder coated refractories are produced.

In the cold coat method, the binder is dispersed into and dissolved in the solvent such as the water and the methanol, whereby the binder having the liquid form is prepared. Then, the binder having the liquid form is added to the refractory aggregates and mixed with them. Then, the solvent is volatilized. In this manner, the binder coated refractories are produced.

In the semi-hot coat method, the binder mixed with or dispersed into the solvent is added to and mixed with the refractory aggregates. Then, the solvent is volatilized. Consequently, the binder coated refractories are produced.

In the powder solvent method, the binder having the solid form is broken and then the broken binder is added to and mixed with the grains of the refractory aggregates and the solvent such as water and methanol. Then the solvent in the mixture is volatilized. Consequently, the binder coated refractories are produced.

According to the above method, the surface of each the refractory aggregate is coated with the coating layer. Consequently, the coating layer has the solid form at 30 degrees C., whereby the binder coated refractories having the granularity and the flowability. However, in view of the workability, the hot coat method is preferably used. In addition, when mixing the refractory aggregates with the binder, it is possible to further add the coupling agent for providing the affinity of the refractory aggregates for the binder. The coupling agent is exemplified by silane coupling agent. In addition, it is possible to further add the carbonaceous material such as black lead (graphite).

When using the binder comprising the sugar group in combination with the thermosetting resin, it is possible to employ the method of coating the refractory aggregate with the sugar group and the thermosetting resin simultaneously. In addition, it is also possible to employ the method of coating the refractory aggregate with the thermosetting resin, and then coating the sugar group with the thermosetting resin on the surface of the refractory aggregates. Consequently, it is possible to prepare the coating layer having two layers. That is, either method may be employed when coating the refractory aggregate with the binder.

In addition, the binder coated refractories of this invention produced in the above may be used as the material of, for example, the casting mold, the refractory bricks, the wall material, and the ceramics.

When manufacturing the casting mold with the binder coated refractories, the binder coated refractories are sprinkled on or filled in the metallic mold and then heated. That is, when heating the binder coated refractories, the sugar group in the coating layer is melted. After melding the sugar group, the binder coated refractories are solidified. Or, after melding the sugar group, the binder coated refractories are caused its cross-linking reaction, whereby the binder coated refractories are hardened. When heating the sugar group to manufacture the casting mold, the sugar group causes little harmful gas when the sugar group is solidified or hardened. It is possible to manufacture the casting mold with reduction of the environmental pollution.

In addition, by pouring the molten metal into the casting mold, the casting metal is manufactured. The sugar group used in the binder to couple the refractory aggregates with each other for the casting mold is thermally decomposed easily at a comparative low temperature. Therefore, the sugar group in the binder is thermally decomposed by the heat of the molten metal. Consequently, the casting mold is easily broken by the heat of the molten metal. In other words, there is no need to apply the impact to the casting mold in order to demold the casting metal. In addition, there is no need to decompose the binder by applying the heat over a long period to demold the casting metal. That is, it is possible to demold the casting metal from the casting mold.

In addition, if the binder comprising the phenol resin in addition to the sugar group is used, it is possible to improve the bonding force of the binder for bonding the refractory aggregates. Therefore, it is possible to produce the casting mold having the mechanical strength.

As explained above, if the binder comprising the sugar group in combination with the phenol resin is used, it is possible to manufacture the casting mold having a high mechanical strength. However, when the binder comprising the thermosetting resin is used, there is a possibility that the binder generates the harmful gas when manufacturing the casting mold and pouring the molten metal into the casting mold. In addition, the breakage property of the casting mold after casting is improved. In view of this, when the thermosetting resin such as the phenol resin is used in combination with the sugar group, an amount of the thermosetting resin should be set such that the proportion of the thermosetting resin in total amount of the binder is equal to or less than 80 percent by mass. In addition, the amount of the thermosetting resin is preferably set such that the proportion of the thermosetting resin in the total amount of the binder is equal to or less than 50 percents by mass. In addition, in order to develop the effect of the thermosetting resin included in the binder, an amount of the thermosetting resin should be set such that the proportion of the thermosetting resin in the total amount of the binder is more than 0 (zero) percents by mass. In addition, an amount of the thermosetting resin is preferably set such that the proportion of the thermosetting resin in the total amount of the binder is equal to or more than 10 percents by mass. Furthermore, in order to develop the sufficient effect of the thermosetting resin included in the binder, an amount of the thermosetting resin is more preferably set such that the proportion of the thermosetting resin in the total amount of the binder is equal to or more than 25 percents by mass.

Figure 1:
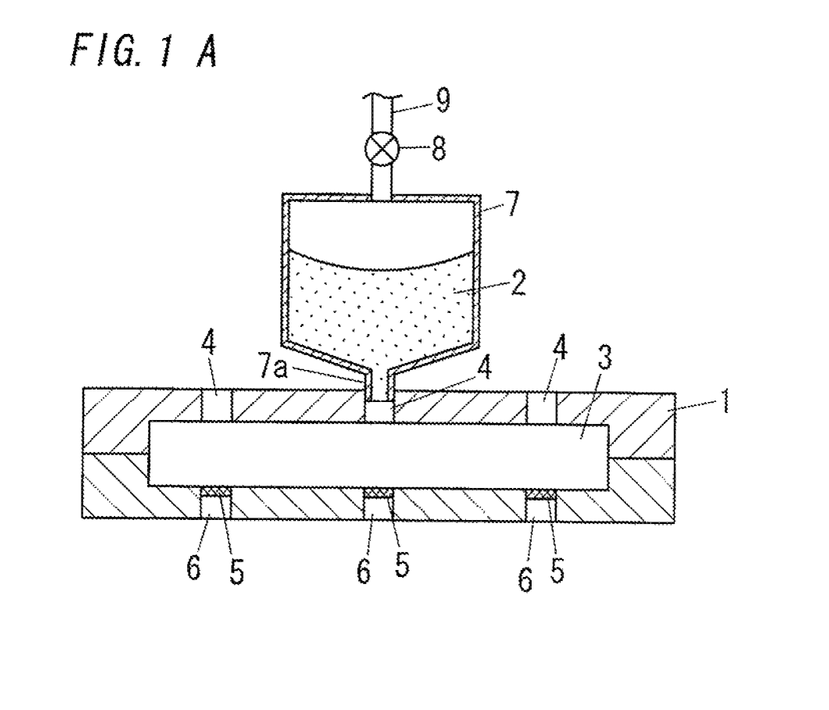

Next, one example of the method of manufacturing the casting mold with the steam is made with FIG. 1. As shown in FIG. 1, the casting flask 1 which is provided at its inside with a cavity 3 and which is provided at its upper surface with an inlet 4. The casting flask 1 is provided at its lower surface with an outlet 6. In addition, the metallic mesh 5 is provided to the outlet 6. The casting flask 1 is configured such that the casting flask 1 is divided into a left section and a right section. Or, the casting flask 1 is configured such that the casting flask 1 is divided into an upper section and a lower section. In addition, the binder coated refractories 2 is stored in the hopper 7. The hopper 7 is connected to the air supply tube 9 having a valve 8. The nozzle 7a in a lower end of the hopper 7 is fit in the inlet 4 of the casting flask 1. Then, the valve 8 is opened. Consequently, the air is supplied to the hopper 7 to add the pressure in the hopper 7. In this manner, the binder coated refractories 2 in the hopper 7 are supplied to the casting flask 1. Thus, the binder coated refractories are filled in the cavity 3 of the casting flask 1. The outlet 6 is provided with the mesh 5. Therefore, it is possible to prevent the leakage of the binder coated refractories 2 to the outlet 6. If a plurality of the inlets 4 and a plurality of the outlets 6 are formed to the casting flask 1, the casting flask 1 is required to have at least one of the inlets 4 for receiving the binder coated refractories 2.

After filling the binder coated refractories 2 in the casting flask 1, the hopper 7 is detached from the inlet 4 of the casting flask 1. Then, as shown in FIG. 1 B, the air supply pipe 10 is connected to each the inlet 4. The air supply pipe 10 is configured to supply the steam or the heated gas, selectively. Firstly, the valve 11 of the air supply pipe 10 is opened to supply the water vapor to the cavity 3 of the casting flask 1.

It is preferred that the saturated water vapor is preferably used as the water vapor. However, superheated steam is more preferably used as the water vapor. The superheated steam is the water vapor which has a perfect gas condition having the boiling temperature or more by heating the saturated water vapor. The superheated steam is a dry steam having the temperature of 100 degrees or more. The superheated steam produced by heating the saturated water vapor may include the water vapor which is constant-pressure expanded without applying the pressure. In addition, the superheated steam produced by heating the saturated water vapor also includes "the steam under pressure" that the pressure is raised without expansion of the steam. The superheated steam supplied to the casting flask 1 is not limited its temperature, especially. The superheated steam may be increased its temperature to 900 degrees C. Therefore, the superheated steam may be set its temperature from 100 degrees C. to 900 degrees C. as necessary. In addition, as to the water vapor, it is possible to use the saturated water vapor having the volume of equal to or more than 0.5 kgf/cm$^2$ (0.5 kilograms force per square centimeter) and equal to or less than 10 kgf/cm$^2$ (10 kilogram forces per square centimeter).

When the water vapor is supplied to the casting flask 1, the binder coated refractories 2 are exposed to the water vapor. Consequently, the water vapor loses the latent heat to the binder coated refractories 2. Therefore, the water vapor is condensed. However, the water vapor has a high latent heat. Therefore, when the water vapor is condensed and drawn its heat, the binder coated refractories 2 are raised their temperature to about 100 degrees C. by the latent heat. The period where the binder coated refractories 2 are heated to about 100 degrees C. by the transfer of the latent heat of the water vapor is varied according to "the temperature of the water vapor", "the flow volume of the binder coated refractories to the casting flask 1", and "an amount of the binder coated refractories filled in the casting flask 1". However, the period that the binder coated refractories 2 is heated to about 100 degrees C. is short time in a range of from 3 seconds to 30 seconds. The water vapor supplied into the casting flask 1 through the inlet 4 heats the binder coated refractories 2 in the casting flask 1 and exhausted through the outlet 6. In addition, by further supplying the superheated steam into the casting flask, the condensed water is evaporated. Consequently, the binder is heated to the temperature that the binder is solidified or hardened. According to this, it is possible to easily manufacture the casting mold.

In addition, after the binder coated refractories 2 are raised its temperature to 100 degree C., the air to be supplied to the air supply pipe 10 is changed to the heated gas. Then, the heated gas is supplied to the casting flask 1. The heated gas is only required its condition where the water content ratio of the heated gas is lower than the above water vapor. Therefore, it is possible to use the heated air. For example, it is possible to use the heated air in the atmosphere as the heated gas and to supply the heated gas to the air supply pipe 10. In addition, it is possible to prepare "the water vapor mixed with the heated air". Consequently, it is possible to decrease the water content amount of the mixture gas. Therefore, the mixture gas may be used as the heated gas. The heated gas is set to have the temperature of such as, but not limited to, equal to or more than 100 degrees C. In addition, the heated gas is set to have the temperature of equal to or more than the temperature sufficient to cause the solidification or the hardening of the binder of the binder coated refractories 2.

After supplying the water vapor into the casting flask 1, the binder coated refractories 2 are quickly raised their temperature to about 100 degrees C. by the latent heat transferred when the water vapor is condensed. However, in order to raise the temperature of the binder coated refractories to 100 degrees C. or more, there is a need to evaporate the condensed water. The condensed water is evaporated by the heating caused by the water vapor supplied thereafter. However, as explained above, the water vapor has high water content. Therefore, the water vapor has a low efficiency of evaporating the condensed water. In view of this, the heated gas is supplied to the casting flask 1. The heated gas has low water content, compared with the water vapor. In addition, the heated gas is a dry air having low moisture. Therefore, the heated gas supplied to the casting flask 1 dries the condensed water created in the casting flask 1 in short times. According to the evaporation experiment of the water by the airflow of the superheated steam and the airflow of the heated gas, the evaporation rate of the water with respect to the superheated steam is greater than the evaporation rate of the water with respect to the heated gas under a condition where the temperature is equal to or less than about 170 degrees C. (T. Yosida, Hyodo, T., Ind. Eng. Chem. Process Des. Dev., 9 (2), 207-214 (1970)) As will be understood from the above report, applying the heated gas to the casting flask 1 makes it possible to evaporate the condensed water and dry the binder coated refractories at short times, compared with a case where the water vapor is continued to be supplied to the casting flask 1.

Therefore, within short times of supplying the heated gas into the casting flask 1, the binder coated refractories 2 are increased their temperature to equal to or more than 100 degrees C. Consequently, it is possible to increasing rate of the temperature in the casting mold 1 to equal to or more than the temperature sufficient to solidify-harden the binder of the binder coated refractories 2. In addition, according to this, it is possible to manufacture the casting mold having the high strength at short times.

In addition, when the condensed water is heated and evaporated by the water vapor explained in the above, the water vapor is decreased its volume. Consequently, if using the water vapor, there is a problem that the pressure of the water vapor is decreased and the water vapor is remained in the casting flask 1. On account of this, "drying" and "temperature increasing" of the binder coated refractories require a lot of time. However, the heated gas has low volume shrinkage due to the condensation. In addition, the heated gas has little decrease of the pressure. Therefore, the heated gas is supplied to an entire of the casting flask 1 from the inlet 4 to the outlet 6. Therefore, it is possible to wholly and uniformly cause the thermal reaction in the casting flask 1, to wholly and uniformly dry the casting flask 1, and to wholly and uniformly increase the temperature of the casting flask 1.

The period where the heated gas is supplied to the casting mold 1 depends on "the temperature of the heated gas", "the flow volume of the heated gas supplied to the casting flask 1", "an amount of the binder coated refractories 2 filled in the casting flask 1", and "an amount of the condensed water in the casting mold 1". However, in general, the period where the heated gas is supplied to the casting mold 1 is short times of, for example, from 5 seconds to 30 seconds. Therefore, after 10 seconds to 1 minute from starting supplying the water vapor into the casting flask 1, the casting mold is manufactured.

As explained above, by using the water vapor, the binder coated refractories are heated by the latent heat of the high condensation of the water vapor in a moment, whereby the binder in the coating layer is solidified-hardened. Therefore, there is no need to heat the casting flask 1 itself at a high temperature in advance. It is possible to stably manufacture the casting mold at short times. In addition, when the harmful gas is generated, the harmful gas is dissolved in the condensed water of the water vapor. Therefore, it is possible to reduce the environmental pollution. Furthermore, when the water vapor is supplied into the casting flask 1 to expose the binder coated refractories to the water vapor, the water vapor is drawn its heat. Consequently, the condensed water is developed. According to the condensed water, the sugar group in the coating layer is swelled, whereby the solid-form sugar group is changed into sticky paste condition. Consequently, the refractory aggregates are bonded by the sugar group having the sticky paste condition. Therefore, the casting mold having the high strength is produced.

Next, the explanation of the method of manufacturing the casting mold by freezing of the water is made. At first, the binder coated refractories of this invention are added to and mixed with the water and mixed with. Then, the mixture of the binder coated refractories and the water is filled in the casting flask. Then the casting flask 1 is cooled in the refrigerator to freeze the water in the casting mold. In this manner, by freezing the water, the binder coated refractories are bonded with the each other, whereby the casting mold is manufactured. An amount of the water with respect to the binder coated refractories is preferably set to from 3 pacts by mass to 20 parts by mass of the water with respect to the 100 parts by mass of the binder coated refractories.

It is noted that, in using the freezed casting mold, when the molten metal is poured into the casting mold which is solidified only by the ice, the ice is easily melt. Therefore, it is difficult to manufacture the large casting mold. In contrast, in the freezed casting mold using the binder coated refractories with the coating layer which has the sugar group, the sugar group in the coating layer is swelled to have a sticky paste condition. By the sugar group having the sticky paste condition, the refractory aggregates are bonded. In addition, the heat applied during pouring the molten metal into the casting mold solidifies-hardens the sugar group. Therefore, it is possible to maintain the strength of the casting mold. In this manner, this makes it possible to manufacture the casting mold having the large size.

In addition, as explained above, by adding the water to the binder coated refractories in this invention, mixing them, and filling the mixture in the casting flask, the refractory aggregates are bonded by the sugar group which is swelled to have a sticky paste condition. Therefore, it is possible to maintain the casting mold's form which has the same shape of the cavity of the casting flask. In addition, by demolding the casting mold from the casting flask and solidifying-hardening the sugar group having the sticky paste condition, the casting mold is produced. In this manner, it is possible to manufacture the casting mold without freezing.

EXAMPLE

Next, the example is specifically explained in the followings.

Examples 1 to 9

The 30 kilograms flattery silica sand heated to 130 degrees C. was supplied to the whirlmixer. Then, the water solution of "the sugar group and the curing agent indicated in the Table 1" dissolved to or dispersed in the water of 450 grams was supplied to the whirlmixer. Then, the mixture is kneaded for 90 seconds. After breaking the mixture, the calcium stearate as the lubricant was added to the mixture. Then, the aeration was made to the mixture. In this manner, the binder coated refractories having the coating layer made of the sugar group was obtained. The binder coated refractories has the coating layer having the weight ratio of 2 percents by mass.

In addition, as shown in Table 1, the sugar group of the following was used.

Dextrin ("No4-C" "No. 102-S" "ND-S" of NIPPON STARCH CHEMICAL Col. Ltd.)

Enzyme Denaturation Dextrin ("Amycol No7-H" "Amycol No6-H" "amycol No3-L" of NIPPON STARCH CHEMICAL Col. Ltd.)

White Superior Soft Sugar (Sucrose 98 percents by mass and reducing sugar 0.7 percents by mass)

It is noted that, regarding the dextrine, the molecular masses of them descends in the order of "No4-C", "No102-S", and "ND-S". Regarding the Enzyme Denaturation Dextrin, the molecular masses of them descends in the order of "Amycol No7-H", "Amycol No6-H", and "Amycol No3-L". In addition, the citric acid was used as the curing agent. In using the citric acid, the citric acid was used as a form of solution of the citric acid dissolved in the water.

TABLE 1

| | | Example (Gram) | | | | | | | | |
|---|---|---|---|---|---|---|---|---|---|---|
| | | 1 | 2 | 3 | 4 | 5 | 6 | 7 | 8 | 9 |
| Flattary Silica Sand | | 30000 | 30000 | 30000 | 30000 | 30000 | 30000 | 30000 | 30000 | 30000 |
| Dextrin | No4-C | 600 | | | | | | | | 588 |
| | No102-S | | 600 | | | | | | | |
| | ND-S | | | 600 | | | | | 300 | |
| Enzyme Denaturation Dextrin | Amycol No7-H | | | | 600 | | | | | |
| | Amycol No6-H | | | | | 600 | | | | |
| | Amycol No3-L | | | | | | 600 | | | |
| White Superior Soft Sugar | | | | | | | | 600 | 300 | |
| Citric Acid | | | | | | | | | | 12 |

Examples 10 to 13

The 30 kilograms flattary silica sand heated to 140 degrees C. was supplied to the whirlmixer. Then, the phenol resin indicated in Table 2 was added to the whirlmixer and then mixed with flattary silica sand. Then, the water solution of "the sugar group in Table 2" was dissolved to or dispersed in the water of 450 grams was added to the mixture of the flattary silica sand and the phenol resin. Then, kneading the mixture for 90 seconds was performed. Subsequently, the aeration was made, whereby the binder coated refractories having the coating layer including the sugar group and the phenol resin was produced. The binder coated refractories had the coating layer having the weight ratio of 2.0 percents by mass.

Comparative Examples 1 to 3

The 30 kilograms flattary silica sand heated to 140 degrees C. was supplied to the whirlmixer. Then, the phenol resin indicated in Table 2 was added to the whirlmixer. Subsequently, mixing them for 30 seconds was made. Then, the water solution of "hexamethylenetetramine" dissolved in the water of 450 grams was added to the mixture of the flattary silica sand and the phenol resin. Then, kneading them for 90 seconds was performed. After breakage of the mixture, as to the lubricant, the calcium stearate of 30 grams was added to the mixture and then kneaded for 15 seconds. In addition, the aeration was made. Consequently, the binder coated refractories having the coating layer made of phenol resin was produced. In the binder coated refractories, the weight ratio of the coating layer has 2.0 percents by mass.

In addition, as shown in Table 2, the followings are used as the sugar group.
- Dextrin ("ND-S" of NIPPON STARCH CHEMICAL Co. Ltd.)
- White Superior Soft Sugar (Sucrose 98 percents by mass and reducing sugar 0.7 percents by mass)

In addition, the followings are used as the phenol resin.
- Novolac type phenolic resin (#4800 of Lignyte Co. Ltd Softening point: 91 degrees C.)
- Resol-type phenolic resin ("LT-9" of Lignyte Co. Ltd Softening point: 91 degree C. Gelation time: 120 seconds (at 150 degrees C.))

TABLE 2

| | Example (Gram) | | | | Comparative Example (Gram) | | |
|---|---|---|---|---|---|---|---|
| | 10 | 11 | 12 | 13 | 1 | 2 | 3 |
| Flattery Silica Sand | 30000 | 30000 | 30000 | 30000 | 30000 | 30000 | 30000 |
| Dextrin ND-S | 450 | 300 | 150 | 150 | | | |
| Novolac Type Phenolic Resin | 52.2 | 105 | 157.2 | 105 | 210 | | 600 |
| Resol Type Phenolic Resin | 97.8 | 195 | 292.8 | 195 | 390 | 600 | |
| White Superior Soft Sugar | | | | 150 | | | |
| Hexamethylenetetramine | | | | | | | 90 |

The binder coated refractories of the example 1 to 13 and the comparative example 1 to 3 were measured their fusion points according to JACT testing methodology C-1. In addition, according to the bending strength testing methodology of JIS K6910 (JIS: Japanese Industrial standard), the test pieces were prepared and measured their bending strength. When preparing the testing pieces, the odor intensity and the kind of the odor were measured by snuffing the odor of the test piece. Furthermore, the test pieces of the examples and the comparative examples which use the phenol resin were measured their formaldehyde and ammonia by use of the gas detector tube of KITAGAWA type. Table 3 indicates these results.

TABLE 3

|  | Example | | | | | | | |
|---|---|---|---|---|---|---|---|---|
|  | 1 | 2 | 3 | 4 | 5 | 6 | 7 | 8 |
| Fusion Point (Degree C.) | 135.6 | 138.2 | 125.6 | 140.3 | 131.6 | 129.5 | 108.3 | 118.5 |
| Bending strength (N/cm$^2$) | 30.4 | 32.4 | 34.3 | 24.5 | 29.4 | 40.2 | 132.4 | 83.4 |
| Odor Strength | Most Minute Level | Most Minute Level | Most Minute Level | Most Minute Level | Most Minute Level | Most Minute Level | Minute Level | Minute Level |
| Kind of Odor | Sweet | Sweet | Sweet | Sweet | Sweet | Sweet | Very Sweet | Very Sweet |
| Concentration in Air of Formaldehyde and Ammonia | — | — | — | — | — | — | — | — |

|  | Example | | | | | Comparative Example | | |
|---|---|---|---|---|---|---|---|---|
|  | 9 | 10 | 11 | 12 | 13 | 1 | 2 | 3 |
| Fusion Point (Degree C.) | 123.5 | 120.3 | 105.3 | 102.8 | 102.4 | 102.1 | 103.2 | 105.5 |
| Bending strength (N/cm$^2$) | 49.0 | 93.2 | 279.5 | 380.5 | 331.5 | 591.3 | 573.7 | 642.3 |
| Odor Strength | Minute Level | Minute Level | Minute Level | Minute Level | Minute Level | Middle | Middle | Strong |
| Kind of Odor | Sweet Sour | Burnt Odor | Burnt Odor | Burnt Odor | Burnt Odor | Formaldehyde Odor | Formaldehyde Odor | Ammonia Odor |
| Concentration in Air of Formaldehyde and Ammonia | — | Not Detected | Not Detected | Not Detected | Not Detected | 0.35 (Formaldehyde) | 0.50 (Formaldehyde) | 5.0 (Ammonia) |

As will be understood from Table 3, each the examples of them did not generate the strong odors, and did not pollute the environment.

Next, the casting molds were produced with the binder coated refractories of examples 1 to 13 and comparative examples 1 to 3. Specifically, the casting flask having the cavity size of 20 millimeters by 10 millimeters by 80 millimeters was prepared. Then, the casting flask was preheated to 120 degrees C. Then, the binder coated refractories was filled into the casting flask at the air pressure of 0.1 MPa (MPa: megapascal) of gauge pressure. Then, the air supply pipe was connected to the casting flask. Subsequently, the superheated steam was supplied into the casting flask. The superheated steam had the temperature of 350 degree C. and the gauge pressure of 0.45 MPa (MPa: megapascal). The superheated steam was supplied into the casting flask at the flow rage of 60 kg/h (kg/h: kilograms per hour) for 20 seconds. The superheated steam was produced from the saturated water vapor which was produced with using the superheated-steam-generation-unit ("GE-100" manufactured by Nomura Giko Co. Ltd) from the saturated water vapor having the gauge pressure of 0.4 MPa (megapascal) and the temperature of 143 degrees C. generated by the boiler.

According to the above, the casting mold having the size of 20 millimeters by 10 millimeters by 80 millimeters as the test piece for the bending strength test was produced. In addition, demolding the casting mold and measuring the odor of the casting mold by snuffing the odor of the test piece were performed. Furthermore, the casting mold were measured their bending strength on the basis of JIS K6910 (JIS: Japanese Industrial Standards). Table 4 indicates the results.

Furthermore, regarding the casting molds, the breaking test was performed. In the breaking test, wrapping the casting molds by the aluminum foil, arranging them on the hearth, and heating them in drying-by-heating apparatus to 400 degrees C. for 30 minutes were performed. Then, after cooling the casting molds, the bending strengths of them were measured on the basis of JIS K6910. In addition, the breaking ratios were calculated on the basis of the following formula with using the factors of "the bending strength before heating" and "the bending strength after heating". Table 4 indicates the results.

[Breaking ratio(percents)=100−(bending strength after heating/bending strength before heating)×100]

TABLE 4

|  | Example | | | | | | | |
|---|---|---|---|---|---|---|---|---|
|  | 1 | 2 | 3 | 4 | 5 | 6 | 7 | 8 |
| Odor of Casting Mold | A | A | A | A | A | A | B | B |
| Bending Strength of the Casting Mold (N/cm$^2$) | 153.0 | 169.7 | 308.9 | 196.1 | 207.9 | 154.9 | 279.5 | 387.4 |
| Bending Strength of the Casting Mold after Heating After Heating (N/cm$^2$) | 12.7 | 15.7 | 23.5 | 17.7 | 25.5 | 11.8 | 25.5 | 66.7 |
| Breaking Ratio (%) | 91.7 | 90.8 | 92.4 | 91.0 | 87.7 | 92.4 | 92.2 | 82.8 |

TABLE 4-continued

|  | Example | | | | | Comparative Example | | |
| --- | --- | --- | --- | --- | --- | --- | --- | --- |
|  | 9 | 10 | 11 | 12 | 13 | 1 | 2 | 3 |
| Odor of Casting Mold | A | A | B | B | B | C | C | D |
| Bending Strength of the Casting Mold (N/cm$^2$) | 387.4 | 220.6 | 442.3 | 591.3 | 493.9 | 554.1 | 589.4 | 563.9 |
| Bending Strength of the Casting Mold after Heating After Heating (N/cm$^2$) | 77.5 | 83.4 | 216.7 | 374.6 | 298.1 | 395.3 | 441.3 | 475.6 |
| Breaking Ratio (%) | 80.0 | 62.3 | 51.0 | 36.7 | 39.6 | 28.7 | 25.1 | 15.1 |

A: Very little Odor
B: Weak Odor
C: Strong Odor
D: Very Strong Odor

As shown in Table 4, each the example did not emit the strong odor and did not pollute the environment. In addition, each the example has a high and good breaking ratio.

In addition, in preparing the casting mold with the binder coated refractories of the examples 1 to 13 and the comparative examples 1 to 3, the superheated steam was supplied into the cavity for 10 seconds, as explained above. Then, the connection of the air supply pipe was varied to the heated air. Then, the heated air having the 350 degrees C. was supplied to the binder coated refractories for 20 seconds. The heated air was that the air having relative humidity of 63 percents at 25 degrees C. which is produced by the hot-air-generation device (TSK-31 of TAKETSUNA MANUFACTORY CO., LTD) was heated to 350 degrees C. The heated air was supplied into the casting mold at the flow rate of 5.7 m$^3$/minute (cubic meters per minute).

According to the above, the casting mold having the size of 20 millimeters by 10 millimeters by 80 millimeters for the test of the bending strength was molded and then the odor of the casting mold after demolding was measured by snuffing. Further, the casting molds were measured their bending strength on the basis of JIS K6910 (JIS: Japanese Industrial Standards). Table 5 shows the results.

TABLE 5

|  | Example | | | | | | | |
| --- | --- | --- | --- | --- | --- | --- | --- | --- |
|  | 1 | 2 | 3 | 4 | 5 | 6 | 7 | 8 |
| Odor of the Casting mold | A | A | A | A | A | A | B | B |
| Bending Strength of the Casting Mold (N/cm$^2$) | 160.1 | 175.3 | 312.4 | 200.1 | 211.5 | 161.3 | 295.0 | 400.6 |

|  | Example | | | | | Comparative Example | | |
| --- | --- | --- | --- | --- | --- | --- | --- | --- |
|  | 9 | 10 | 11 | 12 | 13 | 1 | 2 | 3 |
| Odor of the Casting mold | A | A | B | B | B | C | C | D |
| Bending Strength of the Casting Mold (N/cm$^2$) | 393.5 | 231.5 | 446.5 | 600.4 | 508.5 | 547.3 | 591.6 | 570.6 |

A: Very little Odor
B: Weak Odor
C: Strong Odor
D: Very Strong Odor

As shown in Table 5, each the examples did not emit the strong odor, and did not pollute the environment. In addition, compared with Table 4, the casting molds were improved their strengths.

Next, the 100 parts by mass of the binder coated refractories in the example 4 was mixed with 5 parts by mass of the water, and filled it in the metallic mold for manufacturing the test piece for testing the bending strength on the basis of JIS K6190 (Japanese Industrial Standards). Then, the upper surface of the mixture in the casting mold is flatted by the paddle. Then, the mixture was freezed by the fridge at minus 20 degrees, and then the freezed mixture was demolded. Then, the test piece was immediately measured its bending strength. The result of the bending strength is 198 N/cm$^2$ (Newton per square centimeters).

As a reference, the test piece was produced with the flattery silica sand, instead of the binder coated refractories and was measured its bending strength. The result is 143 N/cm$^2$ (Newton persquare centimeters). Consequently, it is confirmed that using the binder coated refractories makes it possible to produce the casting mold having the high strength.

In addition, the freezed test pieces of the above were naturally defrosted at the room temperature (25 degrees C.) and then dried for 24 hours. According to this, the test piece produced from only the flattery silica sand is broken, whereby only the sand mound was remained. However, the test piece produced by freezing the binder coated refractories of the example 4 was kept to have the solidified condition to have its form as the test piece. That is, it is possible to use the casting mold directly.

Examples 14, 15, and 16

30 kg (kilograms) of the flattery silica sand heated to 130 degrees C. was supplied to the whirlmixer and then the water solution having the sugar group and the curing agent for the sugar group which are indicated in Table 6 dissolved in or dispersed to 450 grams of the water was add to the flattery silica sand in the whirlmixer. Then, the mixture was mixed for 90 seconds. Then, after breaking the mixture, 30 grams of the calcium stearate used as the lubricant was added to the mixture and then mixed them for 15 seconds. Furthermore, the mixture was made aeration. Consequently, the binder coated refractories having the coating layer including the sugar group was prepared. In this binder coated refractories, the weight ratio of the coating layer was 0.33 percents by mass in the example 14, 0.5 percents by mass in the example 15, and 5.0 percents by mass in the example 16.

In addition, as shown in Table 6, as to the sugar group, Dextrin ("ND-S" of NIPPON STARCH CHEMICAL Col. Ltd.) was used.

TABLE 6

|  | Example (gram) | | | |
|---|---|---|---|---|
|  | 3 | 14 | 15 | 16 |
| Flattery Silica Sand | 30000 | 30000 | 30000 | 30000 |
| Dextrin ND-S | 600 | 100 | 150 | 1500 |

Example 17, 18, and Comparative Example 4

The flattery silica sand 30 kg (kilograms) heated at 140 degrees C. was supplied to the whirlmixer. Then, the phenol resin indicated in Table 7 was added to the flattery silica sand. Then, they were mixed with each other for 30 seconds. In addition, the water solution having the sugar group indicated in Table 7 which was dissolved in or dispersed to the 450 grams of the water was added to the mixture. Subsequently, they were mixed for about 90 seconds. After breaking the mixture, 30 grams of the calcium stearate as the lubricant was added to the mixture and then the they were kneaded for 15 seconds. Then, the aeration of them were made. Consequently, the binder coated refractories having the coating layer including the sugar group and the phenol resin was produced. In this binder coated refractories, the weight ratio of the coating layer is 2.0 percents by mass. In addition, the proportion of the phenol resin with respect to the total amount of the binder was 10 percents by mass in the example 17. The proportion of the phenol resin with respect to the total amount of the binder was 80 percents by mass in the example 18. The proportion of the phenol resin with respect to the total amount of the binder was 90 percents by mass.

TABLE 7

|  | Example (gram) | | | | | Comparative example (gram) |
|---|---|---|---|---|---|---|
|  | 10 | 11 | 12 | 17 | 18 | 4 |
| Flattery Silica Sand | 30000 | 30000 | 30000 | 30000 | 30000 | 30000 |
| Dextrin ND-S | 450 | 300 | 150 | 540 | 120 | 60 |
| Novolac-type Phenolic Resin | 52.2 | 105 | 157.2 | 21 | 168 | 189 |
| Resol-type Phenolic Resin | 97.8 | 195 | 292.8 | 39 | 312 | 351 |

The binder coated refractories of the examples 3, 14, 15, 16, 10, 11, 12, 17, and 18, and comparative example 4 were measured their fusion points on the basis of the JACT testing methodology C-1. In addition, the test pieces were manufactured on the basis of the test of bending strength in JIS K6910 (JIS: Japanese Industrial Standards) and were measured their bending strengths. In addition, when manufacturing the test pieces, the strength of the odor and the kind of the odor were measured by snuffing. In addition, the test pieces using the phenol resin of the examples and the comparative examples were measured their formaldehyde and their ammonia by use of the gas detector tube of KITAGAWA type. Table 8 indicates the results.

TABLE 8

|  | Example | | | | | | | | |
|---|---|---|---|---|---|---|---|---|---|
|  | 3 | 14 | 15 | 16 | 10 | 11 | 12 | 17 | 18 |
| Fusion Point (Degree C.) | 125.6 | 130 | 129.0 | 124.3 | 120.3 | 105.3 | 102.8 | 108.0 | 101.5 |
| Bending Strength (N/cm$^2$) | 34.3 | 18.0 | 15.0 | 40.5 | 93.2 | 279.5 | 380.5 | 89.0 | 435.0 |
| Odor Strength | Most Minute Level | Most Little Level | Little Level | Minute Level | Minute Level | Minute Level | Minute Level | Most Minute Level | A little Strong |
| Kind of Odor | Sweet | Sweet | Sweet | Burnt Odor | Burnt Odor | Burnt Odor | Burnt Odor | Sweet | Sweet |
| Concentration of Formaldehyde (ppm) | — | — | — | — | Not Detected | Not Detected | Not Detected | Not Detected | Not Detected |

|  | Comparative Example 4 |
|---|---|
| Fusion Point (Degree C.) | 99.3 |
| Bending Strength | 425.1 |

TABLE 8-continued

| (N/cm²) | |
|---|---|
| Odor Strength | Strong |
| Kind of Odor | Formaldehyde Odor |
| Concentration of Formaldehyde (ppm) | 0.4 |

As shown in Table 8, each the examples did not emit the strong odor, and did not pollute the environment.

Next, the casting molds were manufactured with using the binder coated refractories of examples 3, 14, 15, 16, 10, 11, 12, 17, and 18, and comparative example 4. That is, the casting flask having the cavity size of 20 millimeters by 10 millimeters, by 80 millimeters was prepared and preheated. Then, the binder coated refractories was filled in the casting flask by the air pressure of 0.1 MPa (mega pascal) of gauge pressure. Subsequently, the casting flask was connected to the air supply pipe and then the superheated steam was supplied to the casting flask. The superheated steam had 350 degrees C. and 450 MPa (mega pascal) of the gauge pressure. The superheated steam was produced by the superheated-steam-generation device (GE-100 OF NOMURA GIKO Co. Ltd) such that the saturated water vapor having 143 degrees C. and 0.4 MPa (mega pascal) of the gauge pressure generated by the boiler is heated by the superheated-steam-generation device. The superheated steam was supplied into the casting flask at the flow rate of 60 kg/h (kilogram per hour).

According to this, the casting mold having the size of 20 millimeters by 10 millimeters by 80 millimeters for the test of the bending strength was produced. In addition, the odor of the casting mold after demolding was measured by snuffing. Furthermore, the casting mold was measured its bending strength on the basis of JIS K6910 (Japanese Industrial Standards). Table 9 indicates the results.

Furthermore, regarding the casting molds, the breaking test was performed. In the breaking test, wrapping the casting molds by the aluminum foil, arranging them on the hearth, and heating them in drying-by-heating apparatus to 400 degrees C. for 30 minutes. Then, after cooling the casting molds, the bending strengths of them were measured on the basis of JIS K6910. (JIS: Japanese Industrial Standards). In addition, the breaking rates were calculated from the following formula with using the bending strength before heating and the bending strength after heating. Table 9 indicates the results.

[Breaking ratio(percents)=100−(bending strength after heating/bending strength before heating)×100]

TABLE 9

| | Example | | | | | | | | |
|---|---|---|---|---|---|---|---|---|---|
| | 3 | 14 | 15 | 16 | 10 | 11 | 12 | 17 | 18 |
| Odor of Casting Mold | Little Level | Minute Level | Little Level | Minute Level | Little Level | Minute Level | Minute Level | Little Level | Minute Level |
| Bending Strength of Casting Mold | 308.9 | 85 | 110.0 | 418.6 | 220.6 | 442.3 | 591.3 | 245.1 | 689.0 |
| Bending Strength of Casting Mold After heat treatment (N/cm²) | 23.5 | 1.7 | 3.3 | 52.2 | 83.2 | 216.7 | 374.4 | 12.7 | 478.9 |
| Breaking ratio | 92.4 | 98.0 | 97.0 | 87.5 | 62.3 | 51.0 | 36.7 | 94.8 | 30.5 |

| | Comparative Example 4 |
|---|---|
| Odor of Casting Mold | Extremely Strong |
| Bending Strength of Casting Mold | 745.1 |
| Bending Strength of Casting Mold After heat treatment (N/cm²) | 593.1 |
| Breaking ratio | 20.4 |

As shown in Table 9, each the examples did not emit the strong odors and did not pollute the environment. Further, the casting molds of the examples has high breaking ratios.

In addition, in preparing the casting mold with the binder coated refractories of the examples 3, 14, 15, 16, 10, 11, 12, 17, and 18 and the comparative example 4, the superheated steam was supplied into the cavity for 10 seconds, as explained above. Then, the connection of the air supply pipe was varied to the heated air. Then, the heated air having the 350 degrees C. is supplied to the binder coated refractories for 20 seconds. The heated air was the air having relative humidity of 63 percents at 25 degrees C. which is produced by the hot-air-generation device (TSK-31 of TAKETSUNA MANUFACTORY CO., LTD) was heated to 350 degrees C. The heated air was supplied into the casting mold at the flow rate of 5.7 m³/minute (cubic meters per minute).

According to the above, the casting molds having the size of 20 millimeters by 10 millimeters by 80 millimeters for test of the bending strength were measured their odor by snuffing after demolding. Table 10 shows the results. In addition, regarding the casting molds, the bending strengths were measured on the basis of JIS K6910. Table 10 shows the results.

TABLE 10

|  | Example | | | | | | | | |
| --- | --- | --- | --- | --- | --- | --- | --- | --- | --- |
|  | 3 | 14 | 15 | 16 | 10 | 11 | 12 | 17 | 18 |
| Odor of Casting Mold | Little Level | Minute Level | Little Level | Minute Level | Little Level | Minute Level | Minute Level | Little Level | Minute Level |
| Bending Strength of Casting Mold (N/cm$^2$) | 312.4 | 83.8 | 112.5 | 420.3 | 231.5 | 446.5 | 600.4 | 248.5 | 69.5 |
| Bending Strength of Casting Mold After heat treatment (N/cm$^2$) | 23.7 | 1.8 | 3.5 | 50.0 | 86.4 | 213.9 | 375.2 | 12.4 | 471.2 |
| Breaking ratio | 92.4 | 97.9 | 96.9 | 88.1 | 62.7 | 52.1 | 37.5 | 95.0 | 32.2 |

|  | Comparative Example 4 |
| --- | --- |
| Odor of Casting Mold | Extremely Strong |
| Bending Strength of Casting Mold (N/cm$^2$) | 751.0 |
| Bending Strength of Casting Mold After heat treatment (N/cm$^2$) | 592.5 |
| Breaking ratio | 21.1 |

As will be understood from the above, each the example did not emit the strong odor and did not pollute the environment. Further, each the examples has a good breaking ratio.

Examples 19 to 24

30 kilograms of the flattery silica sand was heated to 130 degrees C. and supplied it to the whirlmixer. Then, the water solution comprising the sugar groups indicated in Table 11 and 450 grams dissolved in or dispersed to the water was added to the whirlmixer. Then, the mixture was kneaded. After breaking, 30 grams of the calcium stearate was added to the mixture and then kneaded for 15 seconds. After kneading, the aeration was made. Consequently, the binder coated refractories having the coating layer made of the sugar groups was produced. In the binder coated refractories, the weight ratio of the coating layer was 20 percents by mass.

In addition, as shown in Table 11, the sugar group of the following was used. Dextrin ("No4-C" "No. 102-S" "ND-S" of NIPPON STARCH CHEMICAL Col. Ltd.) Enzyme Denaturation Dextrin ("Amycol No7-H" "Amycol No6-H" "amycol No3-L" of NIPPON STARCH CHEMICAL Col. Ltd.) That is, the binder coated refractories of the examples 19 to 24 is same as the binder coated refractories of the examples 1 to 6.

TABLE 11

|  |  | Example (gram) | | | | | |
| --- | --- | --- | --- | --- | --- | --- | --- |
|  |  | 19 | 20 | 21 | 22 | 23 | 24 |
| Flattery Silica Sand |  | 30000 | 30000 | 30000 | 30000 | 30000 | 30000 |
| Dextrin | No4-C | 600 |  |  |  |  |  |
|  | No102-S |  | 600 |  |  |  |  |
|  | ND-S |  |  | 600 |  |  |  |
| Enzyme Denaturation Dextrin | Amycol No7-H |  |  |  | 600 |  |  |
|  | Amycol No6-H |  |  |  |  | 600 |  |
|  | Amycol No3-L |  |  |  |  |  | 600 |

Next, the casting molds were produced with the binder coated refractories of examples 19 to 24. That is, the casting flask having the cavity size of 20 millimeters by 10 millimeters by 80 millimeters was prepared. Then, the casting flask was preheated to 120 degrees C. Then, the binder coated refractories was filled into the casting flask at the air pressure of 0.1 MPa (MPa: megapascal) of gauge pressure. Then, the air supply pipe was connected to the casting flask. Subsequently, the superheated steam was supplied into the casting flask. The superheated steam had the temperature of 350 degree C. and the gauge pressure of 0.45 MPa (MPa: megapascal). The superheated steam was supplied into the casting flask at the flow rage of 60 kg/h (kg/h: kilograms per hour) for 15 seconds. The superheated steam was produced from the saturated water vapor which was produced with using the superheated-steam-generation-unit ("GE-100" manufactured by Nomura Giko Co. Ltd) from the saturated water vapor having the gauge pressure of 0.4 MPa (megapascal) and the temperature of 143 degrees C. generated by the boiler. It is noted that a lengthwise direction of the cavity of the casting flask has 80 millimeters. The casting flask was provided at its one longitudinal end defined as the first end and it's the other longitudinal end defined as the second end, the first end being provided with the water vapor inlet, the second end being provided with the water vapor outlet.

In this manner, the casting molds having the size of 20 millimeters by 10 millimeters by 80 millimeters for test of the bending strength were produced. Therefore, the casting molds had heights of 80 millimeters. In addition, each the casting mold had an upper section and a lower section. The upper section is defined by a section above the center of the height direction of the casting mold. The lower section is defined by a section below the center of the height direction of the casting mold. When the casting mold was located in the casting flask, the upper section of the casting mold corresponds to the first end of the casting flask. When the casting mold is located in the casting flask, the lower section of the casting mold corresponds to the second end of the casting flask. Regarding the casting molds, the bending strength were measured on the basis of JIS K 6910. Furthermore, the strength (resistance of breaking) is measured on the basis of the hand-scratching test of JIS K5400 "coating material test" 8. 4. 2. The results are shown in Table 12.

TABLE 12

|  | Example | | | | | |
| --- | --- | --- | --- | --- | --- | --- |
|  | 1 | 2 | 3 | 4 | 5 | 6 |
| Fusion Point (Degree C.) | 135.6 | 138.2 | 125.6 | 140.3 | 131.6 | 129.5 |
| Bending Strength (N/cm$^2$) | 30.4 | 32.4 | 34.3 | 24.5 | 29.4 | 40.2 |
| Strength of Upper Section | 7H | 6H | 6H | 6H | 6H | 6H |
| Strength of Lower Section | 4H | 4H | 3H | 4H | 3H | 3H |
| Odor Strength | Most Minute Level | Most Minute Level | Most Minute Level | Most Minute Level | Most Minute Level | Most Minute Level |
| Kind of Odor | Sweet | Sweet | Sweet | Sweet | Sweet | Sweet |

|  | Example | | | | | |
| --- | --- | --- | --- | --- | --- | --- |
|  | 19 | 20 | 21 | 22 | 23 | 24 |
| Fusion Point (Degree C.) | 135.6 | 138.2 | 125.6 | 140.3 | 131.6 | 129.5 |
| Bending Strength (N/cm$^2$) | 36.8 | 39.5 | 42.2 | 29.9 | 36.2 | 49.8 |
| Strength of Upper Section | 9H or more | 9H or more | 9H or more | 9H or more | 9H or more | 9H or more |
| Strength of Lower Section | 9H or more | 9H | 9H | 9H | 8H | 9H |
| Odor Strength | Most Minute Level | Most Minute Level | Most Minute Level | Most Minute Level | Most Minute Level | Most Minute Level |
| Kind of Odor | Sweet | Sweet | Sweet | Sweet | Sweet | Sweet |

Table 12 shows that the casting molds of Examples 19 to 24 had high strengths, compared with the casting molds of Examples 1 to 6. That is, the casting molds manufactured by the method of Examples 19 to 24 are sufficiently dried their inside according to the heating of the binder coated refractories in the solidification or hardening step. As a result, the bending strengths were improved.

Furthermore, as shown in Table 12, the test pieces of the casting molds of Examples 19 to 24 had the strengths which are greater than the strengths of the test pieces of the casting molds in Examples 1 to 6. In addition, the lower sections of the casting molds of Examples 1 to 6 had the strengths which is lower than the strength of the upper sections of the casting molds of Examples 1 to 6. However, the surface of the lower section of the test piece of the casting mold of Examples 19 to 24 had the strengths which were approximately equivalent to the strengths of Examples 19 to 24. The results regarding the casting molds of the examples 19 to 24 indicates that the casting mold of the examples 19 to 24 had the uniform strengths.

That is, when manufacturing the casting mold according to the method indicated in Examples 19 to 24, the binder coated refractories is firstly filled in the casting flask. Subsequent to the filling step, the solidification or hardening step is performed. In the solidification or hardening step, the casting flask receives the supply of the saturated water vapor. According to this step, the binder coated refractories within the casting flask got wet. According to the moisture of the binder coated refractories, the sugar group had the sticky paste condition. Then, the step of supplying the superheated steam into the casting flask to heat the binder coated refractories was performed. Consequently, the binder coated refractories was increased its temperature. In this manner, the binder coated refractories in the casting flask was heated. As the binder coated refractories was increased its temperature, the binder coated refractories in the casting flask was sufficiently dried, thoroughly. Furthermore, increasing the temperature of the binder coated refractories causes the solidification and the hardening between the binders in the coating layers. Therefore, it is possible to obtain the uniform strength of the binder coated refractories in the casting flask.

As explained above, the method of manufacturing the casting mold comprises a filling step and a solidifying-hardening step. In the filling step, filling the binder coated refractories in the casting flask is performed. The binder coated refractories comprises the refractory aggregates and the coating layers. The refractory aggregates have the fire resistance property. Each the refractory aggregate is coated at its surface with the coating layer. The coating layer comprises the binder which includes the sugar group. The coating layer has a solid form. In the solidification-hardening step, supplying the first water vapor into the casting flask is performed. Consequently, the sugar group is made to have the sticky paste condition. Subsequent to the step of supplying the first water vapor, heating the binder coated refractories is performed to solidify-harden the binders in the coating layers. In this manner, the binder coated refractories are bonded.

Consequently, the casting mold may be manufactured with preventing the emission of the gas which pollute the environment.

The binder coated refractories is preferably heated at a temperature from 100 degree C. or more to 350 degree C. or less.

In addition, the first water vapor supplied into the casting flask preferably has the temperature from 100 degrees C. or more to 400 degrees C. or less.

In addition, as shown in Examples 10, 11, 12, 13, 17, and 18, the coating layer comprises the thermosetting resin.

In addition, the thermosetting resin is the phenol resin.

Consequently, it is possible to provide the strength of the casting mold.

Furthermore, it is preferred that the coating layer has the carboxylic acid. In addition, it is preferred that an amount of the carboxylic acid with respect to the total amount of the sugar group is 0.1 parts by mass or more and 10 parts by mass or less.

In addition, in the solidifying-hardening step, supplying the first water vapor to provide the sugar group of the binder with the sticky paste condition is performed. Then, increasing the temperature of the binder having the sticky paste condition by the latent heat of the first water vapor to solidify-harden the binder having the sticky paste condition is performed.

In addition, in the solidifying-hardening step, subsequent to the step of supplying the first water vapor, "supplying the heated gas into the casting flask" is performed to evaporate the condensed water within the casting flask and to increase the temperature to temperature for solidifying-hardening the binder.

In addition, the heated gas preferably has a temperature of 100 degree C. or more and 500 degree C. or less.

In this case, the heated gas having a little moisture instantaneously evaporates the condensed water. Therefore, it is possible to increase the temperature of the condensed water to 100 degrees C. or more at short times. Therefore, it is possible to increase the rate of increasing the temperature in the casting mold to the temperature to solidify-harden the binder of the binder coated refractories.

In addition, the heated gas is the heated air. Or, the heated gas is the mixture gas comprising the water vapor mixed with the air.

The first water vapor contains a first amount of the water. When the heated gas is the mixture gas which comprises the water vapor and the air, the heated gas has the second amount of the water. In this case, the second amount of the water is lower than the first amount of the water.

In addition, the refractory aggregate comprises at least one of silica sand, pit sand, alumina sand, olivine sand, chromite sand, zircon sand, mullite sand, and artificial sand. Consequently, it is possible to manufacture the casting mold with binder coated refractories having the fire resistance.

It is preferred that the sugar group is at least one of monomeric sugar, oligosaccharides and polysaccharides. Consequently, as well as preventing the emission of the gas which pollutes the environment, the casting mold is manufactured.

In addition, as indicated in the examples 10 to 13, the binder coated refractories is manufactured by the following coating step. Firstly, heating the refractory aggregate is performed. Then, adding the thermosetting resin to the refractory aggregates which are heated is performed. Then, mixing the heated refractory aggregate with the thermosetting resin is performed. Consequently, the mixture of the refractory aggregate with the thermosetting resin is provided. With respect to the mixture, adding the sugar group dissolved in and dispersed to the water is performed. Then, kneading the mixture and the sugar group is performed. Then, the mixture and the sugar group are dried.

It is noted that the coating step preferably comprises the step of adding the thermosetting resin to the refractory aggregate having the temperature range from 50 degrees C. or more to 180 degrees C. or less. In addition, the coating step more preferably comprises the step of adding the thermosetting resin to the refractory aggregate having the temperature range from 110 degrees C. or more to 180 degrees C. or less. In addition, it is more preferred that the coating step comprises the step of adding the thermosetting resin to the refractory aggregate having the temperature range from 130 degrees C. or more to 140 degrees C. or less.

In addition, thus manufactured binder coated refractories has the following structure. The binder coated refractories ideally has the structure that each the refractory aggregate is coated at its surface with the thermosetting resin. In addition, the thermosetting resin is coated at its surface with the sugar group.

With the coating of the sugar group, the casting mold is manufactured as follows. Firstly, the binder coated refractories are supplied to the casting flask. Then, the water vapor is supplied into the casting flask. Consequently, the water vapor swells the sugar group. As a result, the sugar group has the sticky paste condition. The sugar groups having the sticky paste condition are in contact with each other. Therefore, the binder coated refractories are adhered to each other, primarily. Then, the phenol resin is melt. Consequently, the phenol resins coating the refractory aggregates are adhered to each other, secondarily. Consequently, the binder coated refractories are coupled with each other, secondarily. Then, the heated gas is supplied into the casting flask. The heated gas has the temperature which is set to be equal to or higher than the temperature sufficient to solidify-harden the binder. Therefore, the phenol resin is solidified-hardened. Then, the heated gas extracts the water from the sugar group in the sticky paste condition. In this manner, the casting mold having the high strength is manufactured.

In addition, the casting mold manufactured according to this method has the refractory aggregates which are each coated with the phenol resin. Furthermore, the phenol resin is coated with the sugar group. Therefore, if the gas is emitted from the heated phenol resin, the sugar group prevents the gas from emitting from the casting mold. Therefore, the casting mold emits little harmful gas which pollutes the environment. Thus, as well as preventing the emission of the gas polluting the environment, the casting mold is manufactured.

In addition, thus manufactured casting mold also has the sugar group which is located in the outermost position of the coating layer. Therefore, the sugar group of the binder which couples the refractory aggregates of the casting mold is thermally decomposed at the comparatively-low temperature. So, when pouring the high-temperature molten metal into the casting mold, the sugar group is easily thermally decomposed by the heat of the molten metal. Therefore, it is possible to easily break the casting mold by the heat of the molten metal. Namely, the casting mold is easily demolded from the casting flask without applying the impact and without applying the heat for a long period of time to decompose the binder. Therefore, it is possible to easily demold the cast metal from the casting mold.

It is noted that the coating layer may have the phenol resin and the sugar group which are mixed with each other. In contrast, the coating layer may have the first layer and the second layer which coats the first layer. In this case, the first layer is made of the phenol resin, and the second layer is made of the sugar group. When the binder coated refractories of the above is used, the strength of the casting mold is improved. Further, despite the use of the phenol resin, the emission of the harmful gas from the binder coated refractories and the casting mold is prevented.

Specifically, in the example 10, 11, 12, 13, and 17, the binder coated refractories has the refractory aggregate and the coating layer. The refractory aggregate is coated with the coating layer. The coating layer comprises the sugar group and the phenol resin. The sugar group has the solid form. The phenol resin also has the solid form. Firstly, the binder coated refractories is filled in the casting flask. Then, the water vapor is supplied into the casting flask. Consequently, the binder coated refractories is exposed to the water vapor. When the water vapor is applied to the binder coated refractories, the sugar group which coats the surface of the refractory aggregate absorbs the water in the water vapor. Consequently, the sugar group is swelled and has the sticky paste condition. The sugar group having the sticky paste condition has a strong adhesive force. Therefore, the sugar group having the sticky paste condition still coats the surface of the refractory aggregate. Then, the binder coated refractories are adhered to each other with the sugar group having the sticky paste condition. Then, the binder coated refractories is heated. In heating the binder coated refractories, supplying "the heated air" or "the mixture gas which has the heated air mixed with the water vapor" into the casting flask is performed. According to heating the binder coated refractories, the refractory aggregate, the sugar group having the sticky paste condition, and the phenol resin are heated. Consequently, the binder coated refractories are adhered to each other by the phenol resin. However, the phenol resin is heated. Therefore, the phenol resin generates a little amount of the phenol or formaldehyde. However, the refractory aggregate is provided at its surface with the sugar group having the sticky paste condition. The sugar group in the sticky paste condition has the water. Therefore, the phenol and the formaldehyde are dissolved in the water of the sugar group in the sticky paste condition, whereby the phenol and the formaldehyde are kept in the water. Therefore, in the early phase of heating the binder coating refractory, the generation of the phenol and the formaldehyde is prevented. Then, for the sake of extracting the water from the sugar group in the sticky paste condition, "the heated air" or "the mixture air having the heated air with the water vapor" is supplied to the binder coated refractories to heat the binder coated refractories. Consequently, the water in the sugar group having the sticky paste condition is evaporated. As the water in the sugar group evaporates, the phenol and the formaldehyde dissolved in the water is emitted to the atmosphere. However, the sugar group has adsorption effect. Therefore, the phenol or the formaldehyde is adsorbed to the sugar group. In this manner, the sugar group prevents the phenol and the formaldehyde from being emitted out of the casting mold. That is to say, the method of manufacturing the casting mold makes it possible to produce the casting mold having a high strength. Furthermore, the method of manufacturing the casting mold makes it possible to reduce an amount of the phenol and the formaldehyde emitted to the outside of the casting mold.

In addition, as the examples 19 to 24 indicates, this invention discloses the method of manufacturing the casting mold using the binder coated refractories which comprises the refractory aggregate and the coating layer. The refractory aggregate has the fire resistance. The refractory aggregate is coated at its surface with the solid-state coating layer which has the sugar group which acts as the binder. In the method of manufacturing the casting mold, the filling step comprises the solidification-hardening step. In the filling step, filling the binder coated refractories into the casting flask is performed. In the solidification-hardening step, supplying the moisture into the casting flask is performed. Consequently, the binder gets wet. In addition, the sugar group has the sticky paste condition. Then, supplying the superheated steam into the casting flask to heat the binder coated refractories is performed. Consequently, the coating layers are solidified-hardened. Consequently, the binder coated refractories are coupled with each other.

Therefore, the sugar group of the coating layer gets wet and gets the sticky paste condition. Then, the superheated steam is supplied to solidify-harden the sugar group. As a result, the binder coated refractories in the casting flask are uniformly heated to the high temperature, wholly. Therefore, the wet in the casting flask is forced out of the casting flask. Consequently, the high bending strength is applied to the casting mold. Furthermore, the binders are solidified-hardened with each other. Therefore, the casting mold having the surface with the high strength is produced.

In addition, the examples 19 to 24 use the saturated water vapor. However, there is a need to only supply the moisture into the casting mold. That is, there is no need to supply the saturated water vapor to supply the water into the casting mold. Therefore, it is possible to perform the step of "supplying the water sufficient to provide the moisture to the binder" and then "supplying the superheated steam". That is, it is possible to supply the water into the casting flask, directly, or to supply the mist as the water into the casting flask.

The invention claimed is:

1. A method of manufacturing a casting mold using binder coated refractories each comprising a refractory aggregate and a coating layer, each said refractory aggregate having tire resistance, each said coating layer being configured to coat a surface of each the refractory aggregates, said coating layer having a hinder which has a sugar group, each said coating layer having a solid form, said method comprising:
  a filling step of filling: the binder coated refractories in a casting flask;
  a solidifying-hardening step of
    supplying water vapor to an inside of said casting flask to change said sugar groups from a solid condition into a paste condition,
    then, heating said binder coated refractories to solidify-harden said binders in said coating layers, whereby said binder coated refractories are bonded with each other.

2. The method of manufacturing the casting mold as set forth in claim 1, wherein
  the step of heating the binder coated refractories comprises a step of increasing temperature of said sugar group having the paste condition by latent heat of condensation of the water vapor to solidify-harden the binder coated refractories having the paste condition.

3. The method of manufacturing the casting mold as set forth in claim 1, Wherein
  the step of heating the binder coated refractories comprises a step of
    increasing temperature of said sugar group having the paste condition by latent heat of condensation of the water vapor, and
    supplying heated gas into the casting flask to evaporate a condensed water in said casting flask and to heat said binder to the temperature or more for solidifying-hardening said hinder.

4. The method of manufacturing the casting mold as set forth in claim 3, wherein
  the heated gas is a heated air.

5. The method of manufacturing the casting mold as set forth in claim 3, wherein
  said heated gas is a mixture gas which comprises a water vapor mixed with air.

6. The method of manufacturing the casting mold as set forth in claim 1, wherein
  said water vapor is a superheated steam.

7. The method of manufacturing the casting mold as set forth in claim 1, wherein said water vapor is a saturated water vapor, said method comprising steps of:

supplying moisture into the casting flask filled, with said binder coated refractories to provide wet to the binder, then, supplying the superheated steam into the casting flask to heat the hinder coated refractories and to remove the moisture of said binder and increase the temperature of the binder coated refractories by the latent heat of the condensation of the superheated steam, whereby the binders of the coating layers are solidified-hardened and the binder coated refractories are bonded with each other.

8. The method of manufacturing the casting mold as set forth in claim 1, wherein the sugar group has one or more sugars selected from the group consisting of fructose, galactose, maltose, sucrose, lactose, cellobiose, xanthan gum, curdlan, pullulan, cycloamylose, chitin, and cellulose.

9. A method of manufacturing a casting mold using binder coated refractories having granularity and each comprising a refractory aggregate and a coating layer, each said refractory aggregate having fire resistance and having its surface coated with the coating layer having a binder including a sugar group; each said coating layer being presented in a solid condition, said method comprising:

filling the binder coated refractories within a casing flask; and blowing water vapor into the casing flask to cause a reaction of condensing the water vapor in contact with the binder coated refractories and wet the coating, layer with the resulting condensed water to transform the coating layer from the solid condition into a paste condition, followed by giving, heat energy released from the condensation of the water vapor to heat the binder coated refractories for raising the temperature of the coating layer of the paste condition, thereby solidifying or hardening the coating layer to integrate the binder coated refractories into the casting mold.

10. The method of manufacturing the casting mold as set forth in claim 9, wherein the sugar group has one or more sugars selected from the group consisting of fructose, galactose, maltose, sucrose, lactose, cellobiose, xanthan gum, curdlan, pullulan, cycloamylose, chitin, and cellulose.

11. A method of manufacturing a casting mold using binder coated refractories each comprising a refractory aggregate and a coating layer, each said refractory aggregate having fire resistance and having its surface coated with the coating layer having a binder including a sugar group, each said coating layer having a solid condition, said method comprising:

a filling step of filling the binder coated refractories in a casting flask; and a solidifying-hardening step of supplying a first gas including water vapor to an inside of said casting flask to cause a reaction of condensing the water vapor in contact with the binder coated refractories and wet the coating layer with the resulting condensed water to transform the coating layer from the solid condition into a paste condition, then, supplying a second gas which is lower in a water content ratio than the first gas to the inside of said casting flask to evaporate the condensed water in the inside of said casting flask to solidify-harden said binders in said coating layers, whereby said binder coated refractories are bonded with each other.

12. The method of manufacturing the casting mold as set forth in claim 11, wherein the sugar group has one or more sugars selected from the group consisting of fructose, galactose, maltose, sucrose, lactose, cellobiose, xanthan gum, curdlan, pullulan, cycloamylose, chitin, and cellulose.

\* \* \* \* \*